United States Patent [19]

Gilbert

[11] Patent Number: 5,123,896
[45] Date of Patent: Jun. 23, 1992

[54] APPARATUS FOR PARALLELEPIPEDICALLY SHAPING AN AQUACULTURAL ENCLOSURE

[76] Inventor: Jacques Gilbert, 127 C Boulevard Blanqui, 75013 Paris, France

[21] Appl. No.: 401,405

[22] Filed: Sep. 1, 1989

[30] Foreign Application Priority Data

Sep. 2, 1988 [FR] France ............... 88 11524
Dec. 12, 1988 [FR] France ............... 88 16322

[51] Int. Cl.⁵ ............................................. B31B 1/90
[52] U.S. Cl. .................................. 493/962; 493/214; 493/309; 383/69
[58] Field of Search ............. 493/186, 250, 253, 255, 493/259, 475, 476, 468, 453, 458, 309, 962, 210, 212, 213, 214, 927; 383/37, 68, 69, 78, 81, 59, 64, 67

[56] References Cited

U.S. PATENT DOCUMENTS

| | | | |
|---|---|---|---|
| 2,152,323 | 3/1939 | Moore | 493/250 |
| 2,381,850 | 8/1945 | Williams | 493/250 |
| 2,500,363 | 3/1950 | Koeppel | 383/68 |
| 2,724,543 | 11/1955 | Bauer | 383/68 |
| 3,593,625 | 7/1971 | Garret | 493/395 |
| 3,629,905 | 12/1971 | Cote | 383/68 |
| 4,135,439 | 1/1979 | Murrah | 493/453 |
| 4,546,592 | 10/1985 | Reil | 493/255 |

FOREIGN PATENT DOCUMENTS

| | | | |
|---|---|---|---|
| 0233989 | 2/1960 | Australia | 383/68 |
| 2482418 | 5/1980 | France . | |
| 2577106 | 4/1986 | France . | |
| 2590765 | 6/1987 | France . | |
| 2607359 | 6/1988 | France . | |
| 0335602 | 2/1959 | Switzerland | 383/81 |

OTHER PUBLICATIONS

French Search Report, May 12, 1989, Registrtion Numbers FR 8811524/FA 415222.

*Primary Examiner*—Bruce M. Kisliuk
*Assistant Examiner*—Jack W. Lavinder
*Attorney, Agent, or Firm*—Hoffman, Wasson & Gitler

[57] ABSTRACT

A device intended for parallelepidecal shaping an aquacultural enclosure made from a tube of relatively flexible material, characterized by the fact that the device comprises a rigid U-shaped bar exhibiting a slit-shaped opening whose length is approximately equal to a first dimension of the parallelepiped that it is desired to obtain. The device also having two angle pieces which are fitted onto the U-shaped bar to form the parallelepiped aquacultural enclosure.

4 Claims, 6 Drawing Sheets

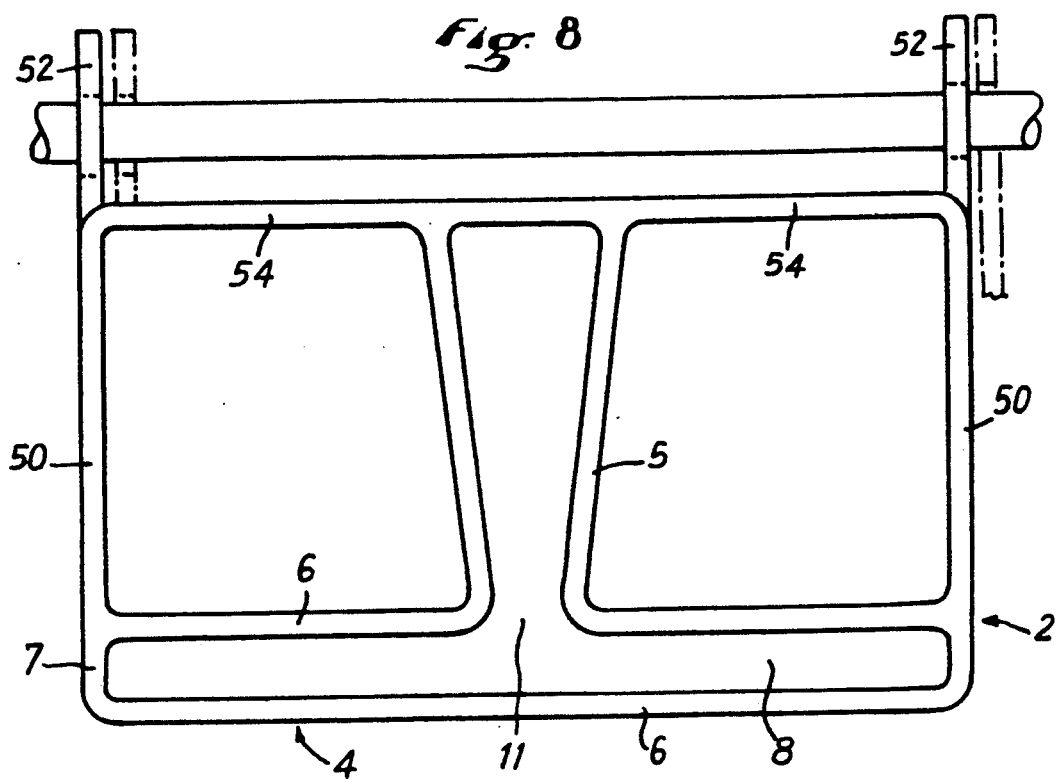
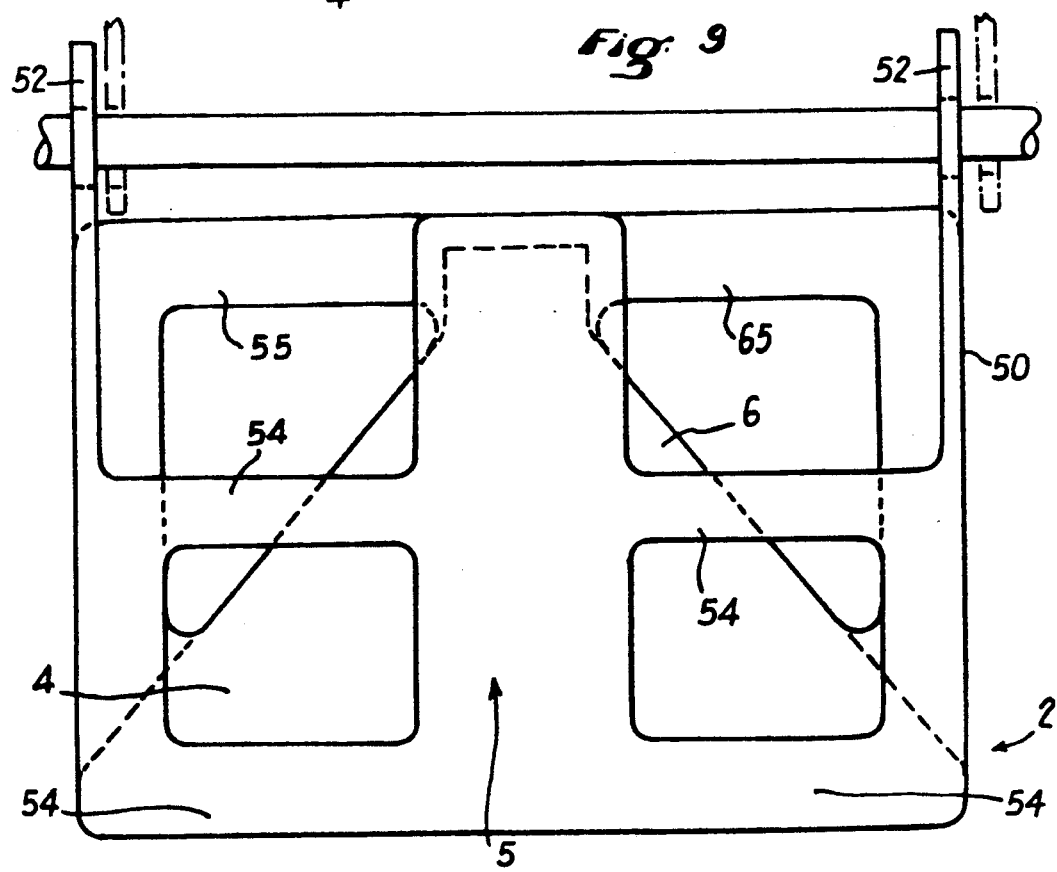

APPARATUS FOR PARALLELEPIPEDICALLY SHAPING AN AQUACULTURAL ENCLOSURE

BACKGROUND

This invention relates to a device intended for parallelepipedically shaping an aquacultural enclosure, and more particularly such an enclosure made from a tube of relatively flexible material.

Oysters, mussels, clams and other bivalves, as well as fish or other aquacultural stock, are now most often raised in latticed enclosures and particularly in ostreicultural pockets, which are generally made from latticed plastic cylinders that are more or less flattened under the usual conditions of use.

Plastic latticed pockets are produced industrially in the shape of a continuous cylinder that is then cut into elements generally having a length on the order of one meter.

The two ends of the cylinder are closed to confine the stock being raised in these pockets. One of the ends can be welded in any way and the other end (or both ends if there is no welding) is closed by a device making it possible to fill the pocket and empty it of its contents. The closings now used consist, for example, of a rod put into the meshes of the pocket, by iron wire hooks, or by a sewing of twine. The drawbacks of these closing processes reside in the fact that they are relatively long to use, hard to mechanize and, further, do not always assure an effective closing of the pocket, particularly at angles. Finally, they frequently cause a crushing of the end thus closed, reducing the inside volume of the pocket.

SUMMARY OF THE INVENTION

One of the objects of the invention is to provide a device making it possible to cause a swelling of the enclosure by giving it an almost rectangular section, i.e., by giving it a parallelepipedic shape and thus, with equal lattice weight, to exhibit a greater inside volume as well as a greater moment of inertia assuring a better longitudinal rigidity.

Another object of the invention is to assure a perfect closing of one or both ends of the enclosure.

Another object of the invention is to make possible a mechanized handling by providing a device that rests largely on the material of the enclosure and thus can resist considerable traction forces.

Another object of the invention is optionally to make possible hooking the enclosures together or to supports.

For this purpose, the invention first has at its object a device intended for parallelepipedical shaping of an aquacultural enclosure made from a tube of relatively flexible material, characterized by the fact that it comprises a rigid angle piece formed from two superposed layers made integral to form between them a cavity exhibiting a slit-shaped opening whose length is approximately equal to a first dimension of the parallelepiped that it is desired to obtain.

The end of the tube being flattened and closed in any way, two corners are thus obtained which can each be introduced into the cavity of a device according to the invention. At the outlet of the slit-shaped opening, two folds are naturally produced which give a rectangular shape to the initial section of the enclosure.

Preferably, one of the two layers comprises a slit emptying approximately perpendicular into said opening.

Actually, the closing devices generally used flatten the enclosure over a certain longitudinal distance, thus making the introduction of corners into the cavity difficult. Said slit thus allows the passage of the flattened end of the enclosure and the closing device.

The two layers can, for example, be approximately in the shape of an isosceles triangle, the opening being formed between the bases of said triangles.

In another embodiment of the invention, the two layers are also in the shape of an isosceles triangle but the opening is then formed between the two equal sides of these triangles.

The device can be made simply by folding a rectangular sheet whose greatest dimension corresponds to the length of the opening of the slit shape, and whose smallest dimension is approximately twice as small. It then suffices, to obtain said slit, to leave a space between the two small sides of the rectangle which, because of the folding, face one another.

In a preferred embodiment, the device according to the invention further comprises a closing shape having a length greater than the second dimension of the parallelepiped which it is desired to obtain, said angle piece comprising a projecting tubular part with an axis approximately parallel to said slit, with a section corresponding to the outside section of said shape, and emptying into said cavity by said slit.

The shape is used to close the outside of the tube, for example, by squeezing. The ends of the shape are then engaged in the projecting tubular part at the same time as the corners of the enclosure are introduced into the cavity. Provided a sufficiently rigid shape is used, an almost rectangular initial section for the enclosure is thus obtained.

Locking means such as notches formed either on the shape or on said angle piece, or both, can be provided to avoid sliding of the angle piece on the shape which would make the unit come apart.

The locking means can also comprise an additional locking element comprising at least one hole of a shape corresponding to the outside section of the shape and intended to be engaged on the latter after the angle piece.

In this case, this locking element advantageously comprises two holes of a shape corresponding to this outside section of the shape, opposite back to back.

This arrangement makes it possible to make two or more enclosures integral with one another by this locking element.

The locking element can further comprise at least a third hole for the passage of a rod for connecting with a second locking element.

Thus, the connecting rod, for example a threaded rod, makes it possible to avoid the separation of the two locking elements and thus the sliding of the angle pieces.

It was already noted that the device according to the invention gives much greater rigidity to the enclosure than do the traditional devices. It is therefore possible to give these enclosures a length clearly greater than that of the enclosures now used. Moreover, it was also noted that the device according to the invention could allow hooking of an enclosure either to a stationary support or to another enclosure, in which case it can be placed vertically.

In both cases, it is desirable to keep the animals contained in the enclosure from gathering in one spot.

For this purpose, the invention also has as its object an element for partitioning an aquacultural enclosure shaped parallelepipedically with at least one device as described above, characterized by the fact that it comprises a rectangular frame whose inside dimensions correspond approximately to a section of the enclosure, this frame being made in two parts one of which at least carries preset spacing rods able to penetrate inside the enclosure when the frame is placed around the latter.

Spacing of the rods, of course, is a function of the size of the stock being raised provided that these rods are not used as support for a mobile partition. The frame can be placed at any level of the enclosure, starting from its outside by introducing the rods through the meshes of the enclosure. The second part of the frame is then secured to the first part.

These frames further have the additional advantage of restoring, from place to place, a rectangular section to enclosures that are very long.

The embodiment described above aims more particularly at the case where it is desired to suspend these enclosures vertically, and particularly to suspend them from one another.

However, it happens in some cases that it is preferred to place the enclosures horizontally, optionally making several integral with one another to facilitate handling.

For this purpose, in a particular embodiment of the invention, there are provided two lateral flanges formed at the ends of the slit-shaped opening, approximately perpendicular to the superposed layers.

These flanges can be used as horizontal supports for the corners of the enclosures that can further comprise, in a particular embodiment, a fastening lug in which is formed a fastening orifice for passage of a connecting rod.

Thus, it is possible by superpoing the fastening lugs of two devices thus made and by making the same rod go through the corresponding orifices, to join the corners of two enclosures. Larger-sized units can be obtained by superposing the fastening orifices of four devices to join the corners of four enclosures together.

The flanges can, for example, be made approximately rectangular, one of their corners being located at the level of said slit, in which case said lugs are preferably made to project at the opposite corner to assure an easy superposition.

In case the devices comprise a tubular projecting part, the invention advantageously comprises at least one brace connecting each of the lateral flanges to this tubular part to stiffen these flanges.

BRIEF DESCRIPTION OF THE DRAWINGS

There will now be described by way of nonlimiting example particular embodiments of the invention with reference to the accompanying drawings in which:

FIG. 8 is a front view of a device according to another embodiment of the invention, FIG. 9 is a bottom view.

DESCRIPTION OF THE PREFERRED EMBODIMENT

Figure 1:
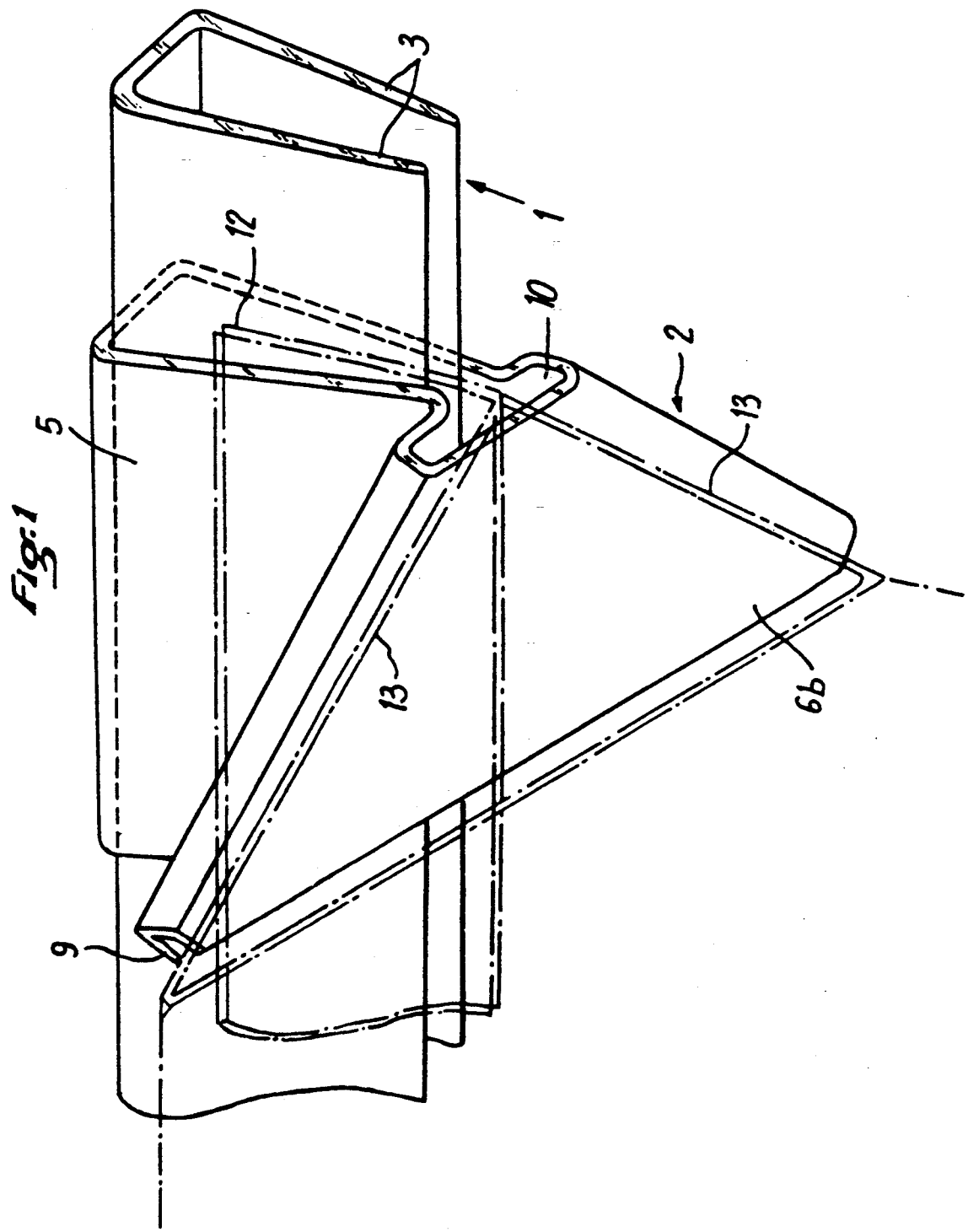
FIG. 1 is a perspective view of a device according to the invention.

In FIG. 1, the device according to the invention has been represented in solid lines, while the enclosure has been schematized in dot-and-dash lines.

This device comprises essentially a shape 1 and an angle piece 2 made of rigid plastic.

Shape 1 is a U shape whose two wings 3 tend to be applied against one another by the effect of elasticity, which assures closing of the enclosure.

Angle piece 2 comprises, on the one hand, a flat part 4 and, on the other hand, a fastening part 5.

Part 4 consists of two practically isosceles triangular plates 6, or actually, in the present case, slightly trapezoidal, joined by their sides at 7 to leave a cavity 8 between them. On the other hand, the base of the triangles (optionally as well as small base 10 in the case of a trapezoid) are not connected so as to form a slit-shaped opening 9.

Part 5 which, in the present case, has the same axial dimension as part 4, although this is not essential, is tubular and its inside section corresponds approximately to the outside section of shape 1.

The lower part of part 5 is open and connected to the edges of a slit 11 formed in plate 6a, thus making cavity 8 communicate with the inside of part 5.

Slit 11 is perpendicular to the bases of plates 6a and 6b and empties in opening 9 so that the axis of part 5 is also approximately perpendicular to opening 9.

To shape parallelepipedically an enclosure made from a flexible tube, a start is made by flattening the end of this tube and introducing the two layers 12, thus obtained, between wings 3 of shape 1.

Then tubular part 5 of angle piece 2 is made to engage on shape 1 by causing two folds 13 to be formed in the part of the tube that sticks out from shape 1, so as to form a triangle 14 which engages in cavity 8.

Another angle piece 2 is placed at the other end of shape 1 so that the end of the enclosure thus formed takes a rectangular shape whose small sides 15 have a length equal to the length of opening 9, i.e., to the base of plates 6a and 6b, and whose large sides 16 are a function of the diameter of the tube originally used.

Figure 4:
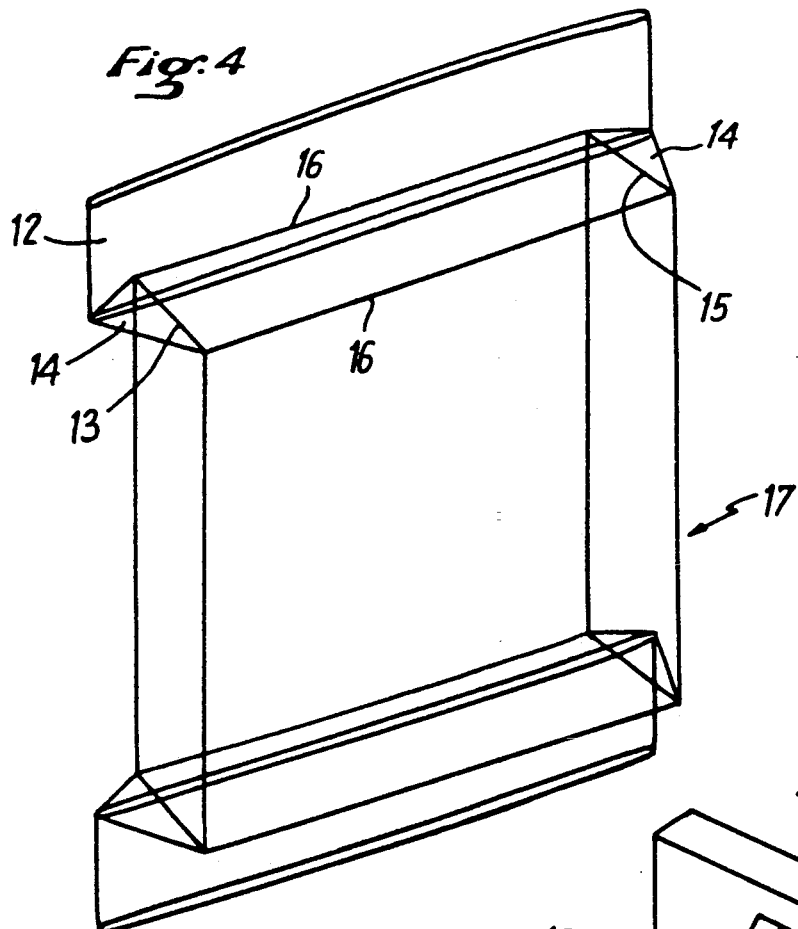
FIG. 4 is a diagrammatic representation of an enclosure obtained with the help of this device.

The set of these operations is then repeated at the other end of the tube, so that then a parallelepipedic enclosure 17 is obtained as represented in FIG. 4.

Figure 5:
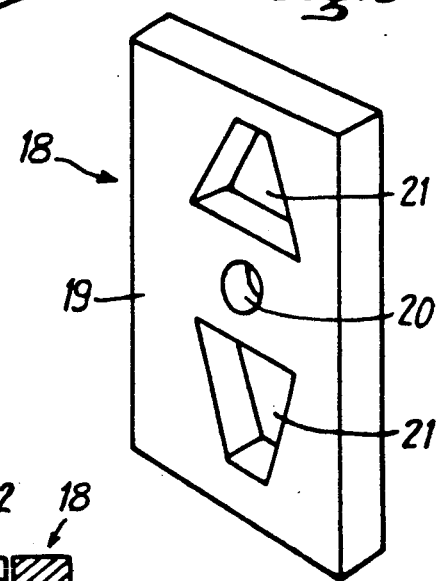
FIG. 5 is a perspective view of a locking element.

Locking of the corner pieces 2 on shapes 1 can be achieved with the help of elements 18 which, as represented in FIG. 5, are in the form of a plate 19 provided with a central hole 20 and two openings 21 having the same shape as the outside section of shape 1. These two openings are placed symmetrically and opposite back to back for each to be able to receive the end of one of shapes 1 of an enclosure 17.

Two elements 18 are thus assembled on both sides of the ends of two enclosures 17 until they come in contact with respective angle pieces 2, then a connecting rod 22 is engaged in holes 20 of the two elements 18 to prevent them from separating. Any means can be provided for this purpose such as nuts if rod 22 is threaded.

Figure 7:
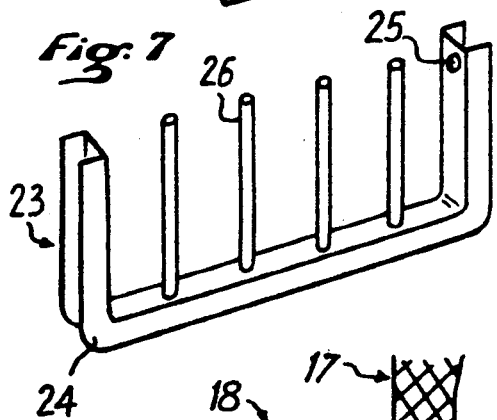
FIG. 7 is a perspective view of a partitioning element according to the invention.
Figure 6:
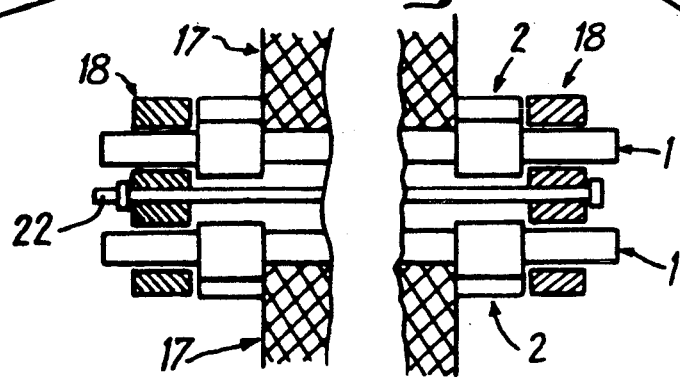
FIG. 6 is a view, partially in section, of two enclosures made integral with the help of this locking device.
Figure 10:
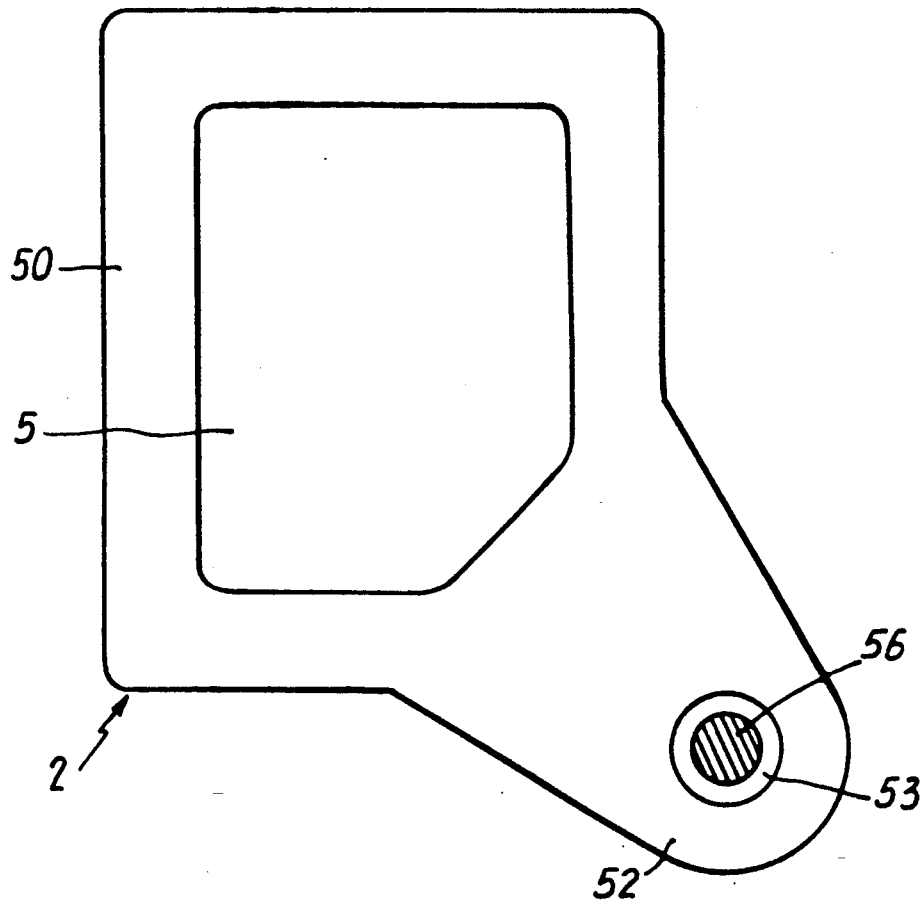
FIG. 10 is a side view.
Figure 11:
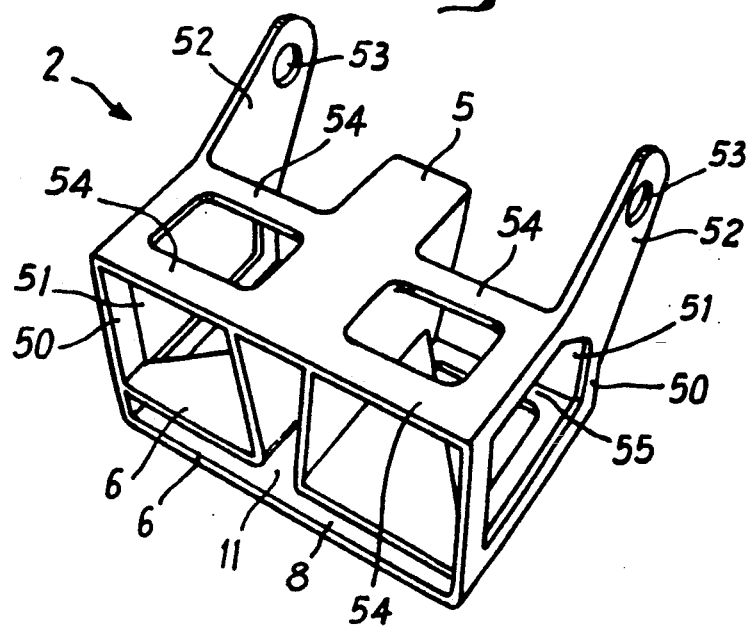
FIG. 11 is a perspective view.

Enclosures 17 obtained according to the invention can particularly be placed vertically, in which case, internal partitions made with the help of the element of FIG. 7 can be provided.

This element 23 is made up of a two-part frame whose one part 24 has a U shape whose inside section corresponds approximately to the cross section of enclosure 17.

The other part of frame 32 (not represented) can consist of a simple rod going through orifices 25 of part 24 and locked in any suitable way.

Rods 26, moreover, are assembled on part 24 of frame 23 perpendicular to its opening.

These partitioning elements are installed on enclosure 17 by engaging this enclosure inside part 24 of the frame, while making rods 26 penetrate inside the enclosure by making them go through the meshes of the enclosure. The frame is then closed and partitioning element 23 is thus kept in position relative to enclosure 17 by rods 26.

Reference is now made to the embodiment of FIGS. 8 to 11, in which the references of the preceding figures have been kept for common elements.

In this case, two lateral flanges 50 are formed at the ends of the opening slit of cavity 8 perpendicular to plates 6. In this case, openings 51 are cut in flanges 50.

These flanges are approximately rectangular and further comprise, in the extension of their corners opposite the ends of the slit, projecting lugs 52 provided with holes 53.

The height of flanges 50 is approximately the same as that of part 5 and the upper edges of these flanges are joined to the upper surface of this part by braces 54.

Other braces 55 join the lower edge of flanges 50 to the lower part of part 5.

These angle pieces function like those of the main patent.

Figure 2:
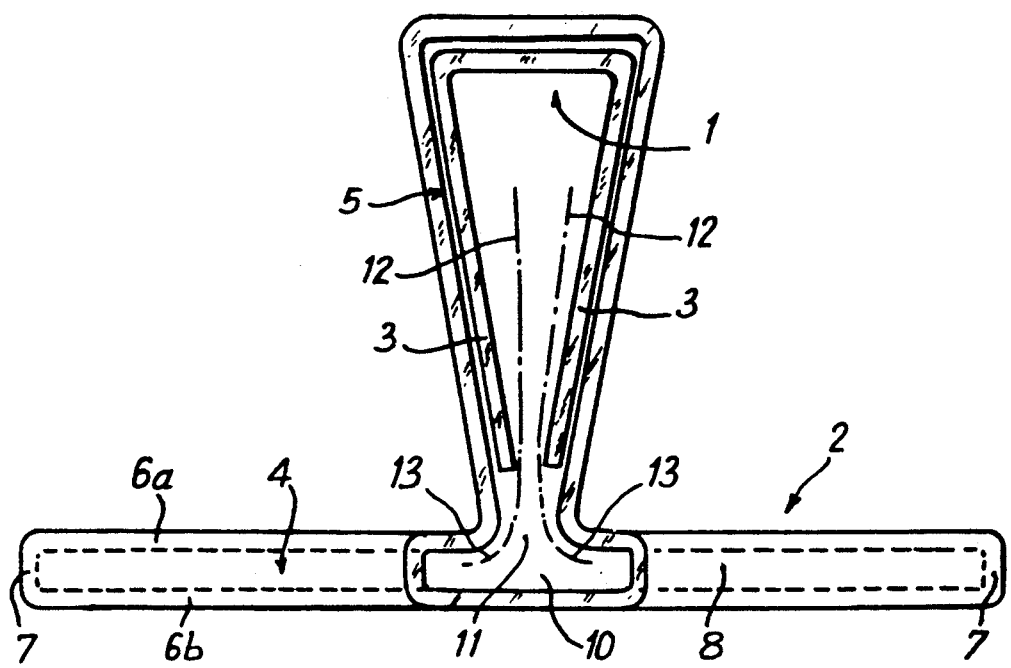
FIG. 2 is a front view.
Figure 3:
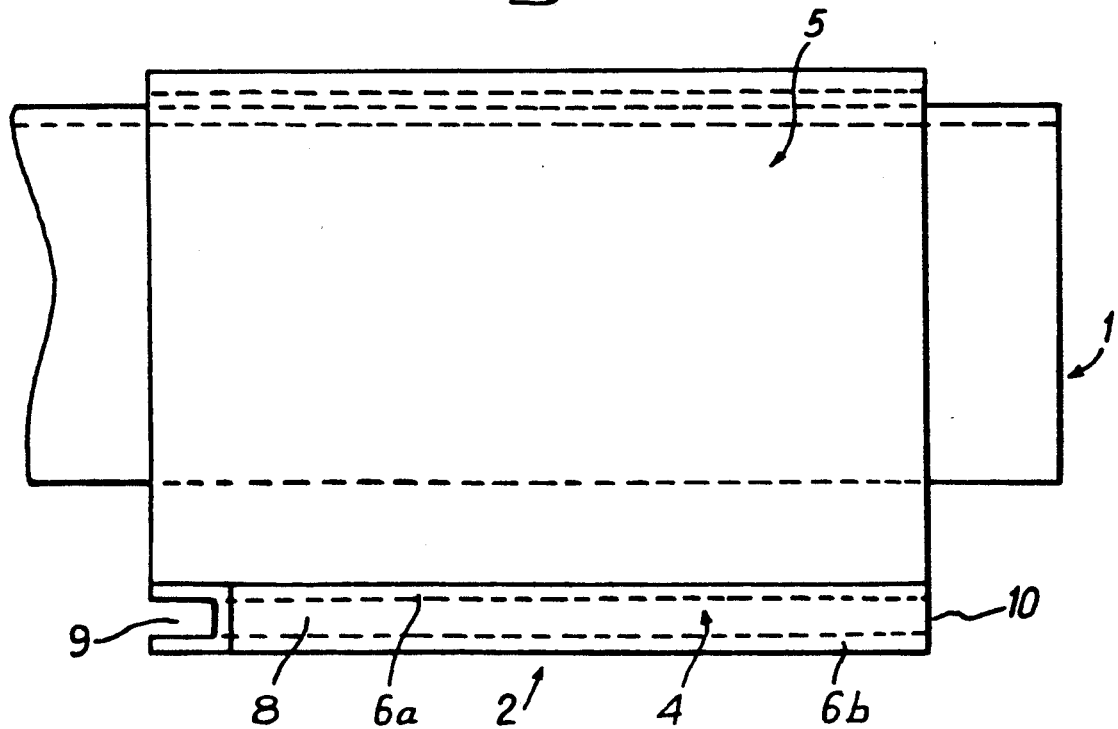
FIG. 3 is a side view.

However, if it is desired to place the enclosures formed with the help of these pieces horizontally, flanges 50 are used as horizontal supports. Further, it is possible to put two angle pieces such as just described back to back by slightly offsetting them laterally so that orifices 53 of their fastening lugs 52 are facing one another. and to make them integral with a rod 56 going through these orifices as represented diagrammatically in dot-and-dash lines in FIGS. 1 and 2.

Two other devices can also be engaged on the same rod with their flanges 50 adjacent to the flanges of the first two devices, which makes it possible to join four corners of four enclosures.

Figure 12:
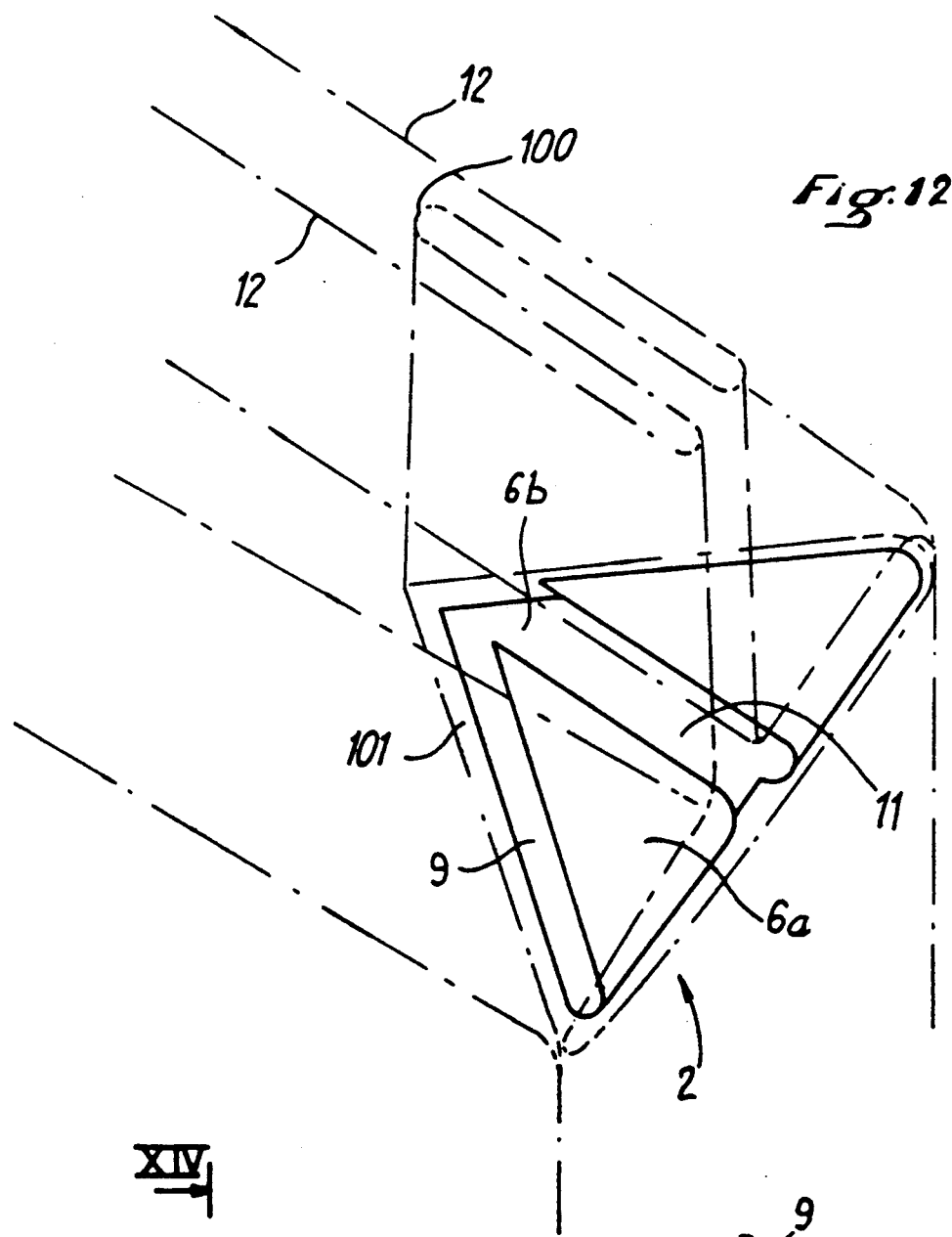
FIG. 12 is a perspective view of another device according to the invention.
Figure 13:
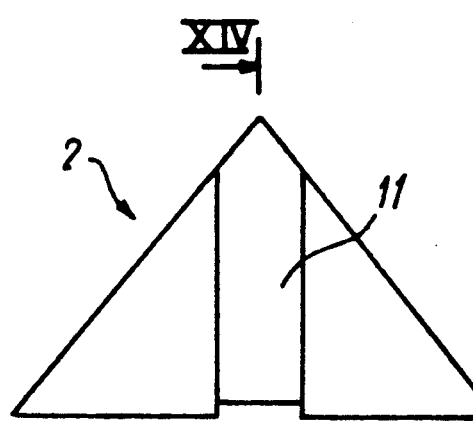
FIG. 13 is a bottom view.
Figure 14:
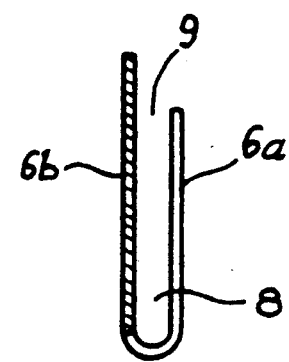
FIG. 14 is a view, in section along XIV—XIV of FIG. 13.

Reference will now be made to FIGS. 12 to 14 representing another embodiment of the invention.

As in FIG. 1, the device has been represented in FIG. 12 in solid lines while the enclosure is schematized in dot-and-dash lines.

Angle piece 2 is always formed by two superposed layers 6a and 6b and in the form of isosceles triangle, layer 6a comprising a slit 11 along its height perpendicular to its base.

On the other hand, slit-shaped opening 9 is now made along the two equal sides of the isosceles triangle, layers 6a and 6b being connected along their respective bases.

In the present case, the two layers 12 of the tube intended to form the enclosure are folded toward the inside at their ends, to form a fold 100 which has the effect of making a triangle of material 101.

Device 2 is engaged on this triangle with its layer 6a below the triangle and its two half-layers 6a above the triangle, fold 100 engaging in slit 11.

Device 2 is made of a sufficiently elastic material so as to squeeze triangle 101 and thus be held on the enclosure.

The length of the base of the two layers is approximately equal to the thickness which it is desired to obtain for the enclosure.

Different variants and modifications can, of course, be made in the above description without thereby going outside the framework or spirit of the invention.

I claim:

1. A device for simultaneously closing an open end of a flexible mesh tube and forming said tube into a parallelepipical shape, aquacultural enclosure, comprising:
    a) at least one U-shaped bar (1) placed at the open end of said tube and clamping said open end into a flattened shape by gripping the edge of said open end of said flexible mesh tube within wings (3) of said U-shaped bar (1); and
    b) at least two angle pieces (2), each fitted upon said U-shaped bar (1), said two angle pieces (2) comprising an open internal cavity defining a first slot (11) located opposite the ends of said wings (3) of said U-shaped bar for receiving an edge of said open end of said flexible mesh tube clamped by said U-shaped bar, and a second slot (9) perpendicular to the first slot and perpendicular to the axis of said tube through which said open end fits into said internal cavity.

2. A device according to claim 1 wherein said open internal cavity is defined between two parallel plane walls (6a, 6b).

3. A device according to claim 2 wherein each of said parallel walls (6a, 6b) is in the shape of an isosceles triangle and said second slot (9) is formed between the bases of said triangles.

4. A device according to claim 1 wherein each of said angle pieces (2) comprise a projecting tubular part (5) through which said U-shaped bar (1) extends.

* * * * *